United States Patent [19]

Alexander

[11] 4,455,590
[45] Jun. 19, 1984

[54] MULTILAYER CERAMIC DIELECTRIC CAPACITORS

[75] Inventor: John H. Alexander, Bishop's Stortford, England

[73] Assignee: ITT Industries, Inc., New York, N.Y.

[21] Appl. No.: 467,533

[22] Filed: Feb. 17, 1983

[30] Foreign Application Priority Data

Mar. 30, 1982 [GB] United Kingdom ............... 8209285

[51] Int. Cl.$^3$ ........................ H01G 1/00; H01G 13/00
[52] U.S. Cl. ................................... 361/306; 29/25.42; 361/321
[58] Field of Search ............... 29/25.42; 361/306–308, 361/311–313, 321, 304, 305

[56] References Cited

U.S. PATENT DOCUMENTS 3,604,082 9/1971 McBrayer et al. ............. 361/321 X
3,612,963 10/1971 Piper et al. ......................... 361/321
3,755,723 8/1973 Short ................................... 361/321

FOREIGN PATENT DOCUMENTS 1424879 2/1976 United Kingdom .

OTHER PUBLICATIONS

I.E.E.E. Transactions on Parts, Hybrids, and Packaging, vol. PHP-13, No. 3, Sep. 1977, pp. 279–282, 361–366.

Primary Examiner—Donald A. Griffin
Attorney, Agent, or Firm—John T. O'Halloran; Peter R. Ruzek; Mary C. Werner

[57] ABSTRACT

End terminations for multilayer ceramic dielectric capacitors, particularly but not exclusively metal-impregnated capacitors, are provided by bonding a coarse ceramic powder, which is lightly coated with silver, to the capacitor ceramic by means of a glass frit in order to produce a porous pseudo end termination containing insufficient silver to provide a good contact to the capacitor electrodes. The exposed silver in the pseudo end termination is then provided with a silver sulphide layer and subsequently the pseudo end termination is impregnated with lead. The end termination thus formed is comprised substantially of lead, which is held in place by the silver sulphide layer, that is wetted by the lead, on the bonded ceramic powder, and thus low cost and readily solderable.

14 Claims, 1 Drawing Figure

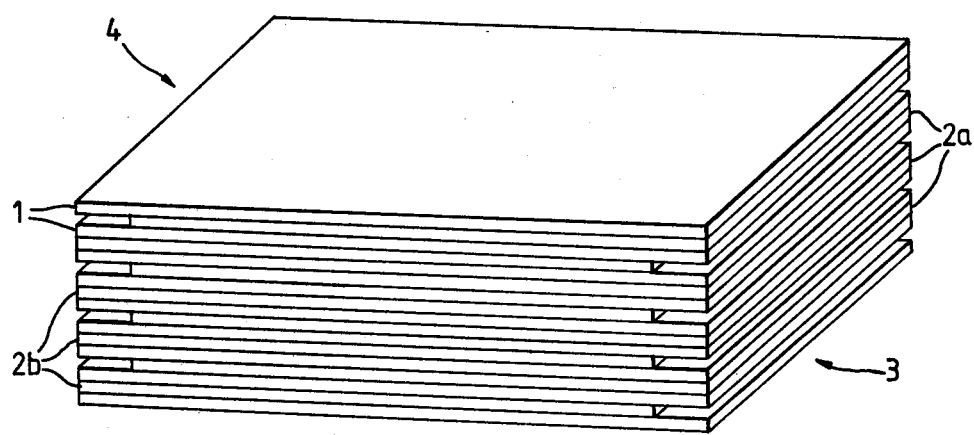

MULTILAYER CERAMIC DIELECTRIC CAPACITORS

SUMMARY OF THE INVENTION

This invention relates to electrical components such as multilayer ceramic dielectric capacitors and in particular, but not exclusively, to metal-impregnated electrode multilayer ceramic dielectric capacitors.

According to one aspect of the present invention there is provided a method of manufacturing an electrical solderable connection termination in an electrical component comprising forming on an exposed surface of the component a very porous pseudo termination in which the pores are lead wettable, and impregnating the pseudo termination with lead or a lead alloy to produce the solderable connection termination.

According to another aspect of the present invention there is provided a method of manufacturing an electrical solderable connection termination in an electrical component comprising forming a porous pseudo termination on the component substrate by firing a frit containing glass and a coarse ceramic powder thereon, the ceramic powder having a coating of a first metal, and impregnating the psuedo termination with a second metal whereby to provide a connection termination comprised by the second metal held in place by the fired-on ceramic powder.

According to a further aspect of the present invention there is provided a method of manufacturing a multilayer ceramic dielectric capacitor including the steps of applying a frit containing glass and a coarse ceramic powder, having a coating of a first metal, to end faces of the capacitor to which electrodes of the capacitor extend, firing the frit to provide pseudo end terminations and impregnating the pseudo end terminations with a second metal to provide end terminations in contact with the capacitor electrodes and comprised by the second metal held in place by the fired-on ceramic powder.

BRIEF DESCRIPTION OF THE DRAWING

Embodiments of the present invention will now be described with reference to the accompanying drawing which shows a perspective schematic view of a basic multilayer ceramic dielectric capacitor structure.

DETAILED DESCRIPTION OF THE PREFERRED EMBODIMENT

The basic capacitor comprises a stack of ceramic dielectric layers 1 with electrodes 2a and 2b therebetween. Alternate electrodes 2a terminate at the right hand face 3 and do not extend completely to the left hand face 4, whereas alternate electrodes 2b extend to the left hand face 4, but do not reach the right hand face 3. Thus the electrodes 2b can be electrically interconnected at the end face 4 (end terminated) and the electrodes 2a can be likewise electrically interconnected at the end face 3, to form two electrically insulated sets of electrodes 2a and 2b. In order to facilitate preparation of the drawing, which is only schematic, the electrode sets are shown as extending to the lateral sides of the stack. However, in practice neither set of electrodes extend to the lateral sides, which in the finished device are all ceramic. Instead of the internal electrodes 2a and 2b being rectangular and stepped sideways in successive layers as shown, they may alternatively, for example, have elongate portions which cross one another, as described in British Application No. 41677/78 (Ser. No. 2032689) of A. L. Oliver and G. Mills, or instead of being rectangular the electrodes may be comprised of pluralities of parallel conductive lines, as described in British Application No. 8204777 of J. H. Alexander.

The manufacture of multilayer ceramic dielectric capacitors with the basic structure shown in the drawing comprises the following steps. Green (unfired) ceramic sheets of barium titanate, for example, are prepared in a conventional manner, for example tape casting, tape drawing or printing. In order to manufacture capacitors in quantity a screen-printing technique is employed to print a large number of electrodes side by side on one relatively large sheet of green ceramic, although alternatively a single electrode may be provided on a suitably sized sheet of green ceramic. The electrodes may be printed by means of a conductive ink or, in the case of metal-impregnated electrodes, the printed electrodes on the green ceramic comprise fugitive electrodes printed by means of a fugitive electrode ink comprising a charcoal powder with a binder and solvent such as to make it compatible with the green ceramic. Further sheets are similarly printed. A number of such sheets, the number corresponding to the number of electrodes in each capacitor, are stacked one on top of the other with the electrodes staggered and partially overlying one another as illustrated in the drawing. A blank green ceramic sheet is applied to the top of the stack. Extra blank green ceramic sheets may be applied to the top and bottom of the stack in order to protect the outer electrodes and to give adequate strength to the finished device. The block of stacked green ceramic sheets thus formed is cut to make individual green capacitor elements. The electrodes do not extend up to the lateral cut faces as previously mentioned.

Subsequently the capacitors are fired. In the case of fugitive electrode devices the green capacitor elements are heated at for example 1° C./min to 350° C., to bake out the binders in the fugitive ink and the green ceramic, before firing at, for example, 200° C./hour to 1120° C. for 2 hours in a conventional manner, during which firing the charcoal of the fugitive ink burns, providing spaces between the dielectric layers comprised by the fired ceramic sheets which become sealed together during the firing process.

The fired capacitor elements are then end terminated at faces 3 and 4 whereby to connect the alternate electrodes 2a and 2b of the drawing, or in the case of fugitive electrodes, to connect the alternate spaces between the dielectric layers. After firing, the electrodes 2a, or spaces corresponding thereto, are exposed at end face 3, whereas only the electrodes 2b, or spaces corresponding thereto, are exposed at end face 4, the illustrated gaps at the end faces 3 and 4 provided by the staggered overlying arrangement of the electrodes being closed by ceramic of the dielectric layers 1 during the manufacturing process. Likewise the lateral faces are closed by ceramic. Thus end terminations applied to end faces 3 and 4 can only connect a respective one set of electrodes, or spaces.

The end terminations of multilayer ceramic capacitors, in particular fugitive electrode (lead impregnated) capacitors, are conventionally formed from precious metals such as silver or silver/palladium mixtures. These metals are used as fine powders and are bonded to the ceramic by firing on together with glass frits. Such terminations are expensive, in view of the precious metal content, and subject to silver leaching by the lead of lead impregnated capacitors. While we have successfully used aluminum and aluminum/silver terminations in an attempt to solve the dissolution problem and provide cheaper end terminations, as is described for example in co-pending U.S. Application Ser. No. 404,745, filed Aug. 3, 1982 of J. H. Alexander, these terminations are not always readily solderable and require further treatment to render them so. We have also found that silver/glass frit terminations can be treated such as to overcome the dissolution problem and solderability problem in one step. This is accomplished by lightly sulphiding the silver of silver/glass frit terminations as is described in British Application No. 8209283, J. H. Alexander. In the case of lead impregnated capacitors, the silver sulphide layer formed on the silver provides a barrier between the lead and the silver which prevents silver leaching by the lead, and the lead wets the silver sulphide layer to provide a lead layer therein which renders the termination readily solderable. These sulphided terminations still include a high proportion of silver and are thus expensive to produce.

We have now found that it is possible to replace almost all of the precious metal content of bonded silver terminations with cheaper materials and produce an end termination which is readily solderable and leach resistant.

The terminations of the present invention are made by lightly coating the surfaces of ceramic powders, such as alumina $Al_2O_3$, silica, $SiO_2$, for example, with silver. The silver-coated ceramic powder is then mixed with a glass frit and made into a termination paste which is applied to a capacitor, or other suitable electrical component, such as film circuits, in a conventional manner and fired to bond it thereto at a temperature of the order of, for example, 700° C. The firing temperature is dependent on the glass frit used and may be in the range of 500°-800° C. The end terminations thus formed contain so little silver that they do not conduct enough to give a good contact with the electrodes of the capacitor, and are thus termed "pseudo end terminations".

The exposed silver coating on the pseudo end terminations is then lightly sulphided. This may be accomplished by heating the capacitors to 350°-400° C. in a chamber that can be evacuated to remove air from the voids in the pseudo end terminations and the capacitors and subsequently admitting small quantities of hydrogen sulphide or sulphur vapor, for example, into the evacuated chamber where it forms silver sulphide $Ag_2S$ on contact with the silver. The capacitors are then transferred to lead impregnation equipment where air is evacuated from voids in the capacitors, which are then immersed in molten lead that is forced into the pseudo end terminations by nitrogen under pressure, whereby the terminations become filled with and coated by lead. In the case of fugitive electrode capacitors, impregnation of the lead into the spaces in the capacitor will be simultaneously achieved. The end terminations thus formed are comprised substantially by lead which is held in place by the fritted ceramic powder. The silver and silver sulphide coating processes serve to ensure that the lead is held to the ceramic powder by virtue of the lead wetting the silver sulphide layer. In view of the preponderance of lead, the end terminatons thus formed are readily solderable, in order to facilitate, for example, the soldering of connection wires thereto. There are no silver leaching problems resulting in lack of end terminations, in view of the low proportion of silver employed and the barrier effect provided by the silver sulphide layer.

The ceramic powder employed is necessarily of a relatively coarse nature such that the pseudo end terminations are very porous in order to facilitate the sulphiding and lead impregnation steps. The ceramic powders may be coated with silver in solution. Typically the silver coating is of the order of 0./-0.3 μm thick, and the ceramic powders are of 20-50 μm particle size. The sulphiding agents may alternatively comprise organic materials such as $CH_3SH$, $C_2H_5SH$, for example.

I claim:

1. A method of manufacturing an electrical solderable connection termination on an electrical component comprising:

forming on a surface of the component a porous termination containing a first metal in an amount below that required to form a conductive connection with the electrical component; and impregnating the porous termination with a second metal in an amount sufficient to form a solderable conductive connection with the electrical component.

2. The method as claimed in claim 1 further comprising the step of forming an electrode in the electrical component by impregnating the electrical component with the second metal, the electrode contacting the porous termination.

3. A method of manufacturing a multilayer ceramic dielectric capacitor comprising the steps of:

forming electrodes on the layers, the electrodes extending to alternating ends of the layers;

forming porous end terminations on the ends of the layers by applying and firing a frit to the ends of the layers, the frit containing glass and a coarse ceramic powder, the powder having a coating of a first metal in an amount below that required to form a conductive termination;

sulphiding the porous end terminations; and impregnating the sulphided porous end terminations with a second metal in order to provide conductive connection terminations, the conductive connection terminations contacting the electrodes.

4. The method as claimed in claim 3 wherein the capacitor electrodes are formed by impregnating the ceramic layers with the second metal, the formation of the electrodes occurring at the same time as the formation of the porous end terminations.

5. The method as claimed in claim 3 wherein the first metal is silver and the second metal is selected from the group consisting of lead and a lead alloy.

6. The method as claimed in claim 5, wherein the ceramic powder is selected from the group consisting of alumina and silica.

7. The method as claimed in claim 5 wherein the sulphiding step forms a silver sulphide layer by contacting the exposed silver of the end terminations with a sulphur selected from the group consisting of hydrogen sulphide and sulphur vapor.

8. The method as claimed in claim 3 wherein the frit is fired at a temperature in the range of 500°-800° C.

9. The method as claimed in claim 3 wherein the step of sulphiding the porous end terminations comprises contacting the terminations with a sulphur gas selected from the group consisting of hydrogen sulphide and sulphur vapor.

10. The method as claimed in claim 9 further comprising, prior to sulphiding the terminations, the steps of evacuating air from voids in the porous end terminations and heating the capacitor to a temperature in the range of 350°–400° C.

11. A multilayer ceramic dielectric capacitor comprising:
a plurality of ceramic dielectric layers;
electrodes located in between the layers and extending to one of the ends of the layers;
porous nonconductive end terminations located on the ends of the layers;
a sulphide layer located on the porous end terminations; and
a lead conductive coating impregnated in the sulphided porous end terminations.

12. The multilayer ceramic dielectric capacitor as claimed in claim 11 wherein the porous end terminations comprise a fired frit containing glass and a coarse ceramic powder coated with silver.

13. A method of manufacturing an electrical solderable connection termination on an electrical component comprising:
applying frit to the surface of the component, the frit containing glass and a coarse ceramic powder, the ceramic powder having a coating of a first metal in an amount below that required to form a conductive connection with the electrical component;
firing the frit to form a porous termination; and
impregnating the porous termination with a second metal in an amount sufficient to make the termination electrically conductive to establish a solderable conductive connection with the electrical component.

14. The method as claimed in claim 13, wherein the first metal is silver and the second metal is selected from the group consisting of lead and lead alloy.

* * * * *